US006459439B1

(12) United States Patent
Ahlquist, Jr. et al.

(10) Patent No.: US 6,459,439 B1
(45) Date of Patent: Oct. 1, 2002

(54) RESHAPING OF PATHS WITHOUT RESPECT TO CONTROL POINTS

(75) Inventors: John B. Ahlquist, Jr., Garland; Douglas S. Benson, Plano; Fan Yu, Allen; Steven R. Johnson; Brian T. Schmidt, both of Dallas, all of TX (US)

(73) Assignee: Macromedia, Inc., San Francisco, CA (US)

(*) Notice: Subject to any disclaimer, the term of this patent is extended or adjusted under 35 U.S.C. 154(b) by 0 days.

(21) Appl. No.: 09/037,720

(22) Filed: Mar. 9, 1998

(51) Int. Cl.[7] .............................. G06T 3/20; G06T 11/00
(52) U.S. Cl. ........................................ 345/672; 345/619
(58) Field of Search ................................ 345/437, 439, 345/433, 427, 501, 678, 619, 672, 680, 681; 382/305; 707/203; 358/133

(56) References Cited

U.S. PATENT DOCUMENTS

| 5,231,484 A | * | 7/1993 | Gonzales | 358/133 |
| 5,577,190 A | * | 11/1996 | Peters | 345/501 |
| 5,689,287 A | * | 11/1997 | Mackinlay et al. | 345/619 |
| 5,892,691 A | * | 4/1999 | Fowler | 345/433 |
| 5,977,994 A | * | 11/1999 | Greenberg et al. | 345/501 |
| 5,978,523 A | * | 11/1999 | Linford et al. | 382/305 |
| 6,020,876 A | * | 2/2000 | Rosenberg et al. | 345/157 |
| 6,320,583 B1 | * | 11/2001 | Shaw et al. | 345/619 |

* cited by examiner

Primary Examiner—Matthew Luu
Assistant Examiner—Chanté Harrison
(74) Attorney, Agent, or Firm—Fulbright & Jaworski L.L.P.

(57) ABSTRACT

The inventive mechanisms convert a path, which represents a graphical object, into a plurality of line segments. Thus, the path can be reshaped without respect to existing Bezier control points. The first mechanism allows a user to 'pull' a segment of a path. A user selects a specific place on the path, pulls the selected place along with a portion of the path on either side of the place to a desired location. The second mechanism allows a user to 'push' a segment of a path, by using an arbitrary shape and sculpting the path. The arbitrary shape is used in a manner similar in which a sculptor would use a putty knife and sculpts away part of the path, by pushing that shape into the path. The path is being repelled from the shape, as the shape is being pushed. The third mechanism allows a user to reshape an area or region of the path. The user selects a specific point in space and modify any parts of the path that lie within that region of space.

60 Claims, 5 Drawing Sheets

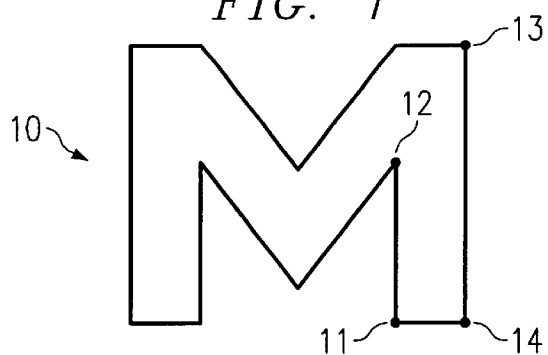
FIG. 1
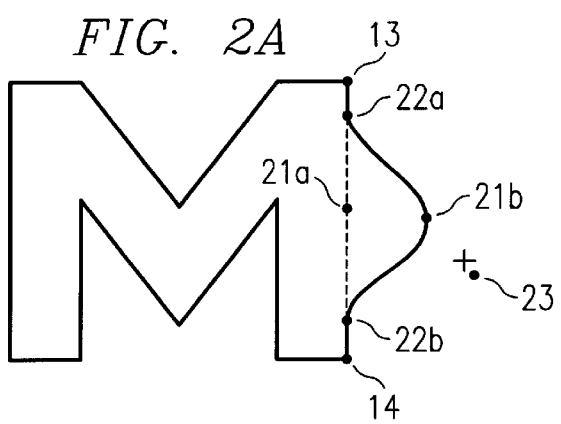
FIG. 2A
FIG. 2B
| LENGTH | 50 |
|---|---|
| PRESSURE | 0 |
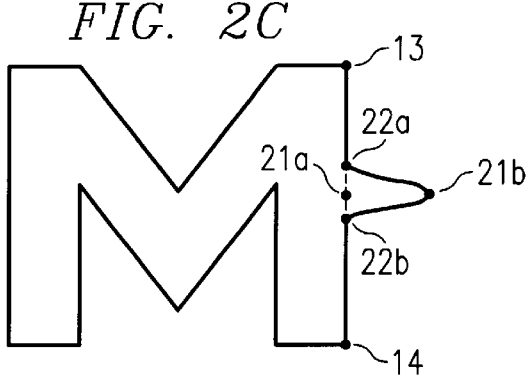
FIG. 2C
FIG. 2D
| LENGTH | 5 |
|---|---|
| PRESSURE | 0 |
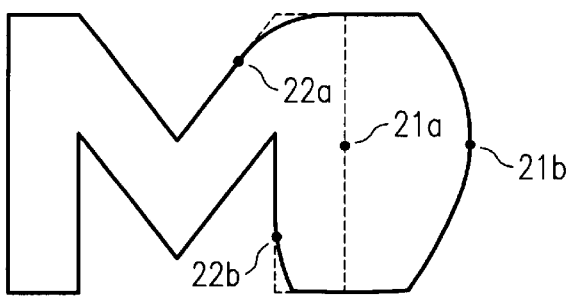
FIG. 2E
FIG. 2F
| LENGTH | 500 |
|---|---|
| PRESSURE | 0 |

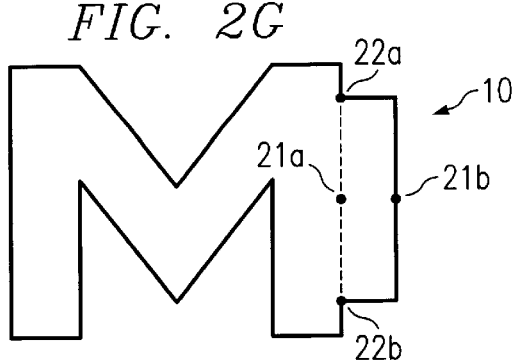
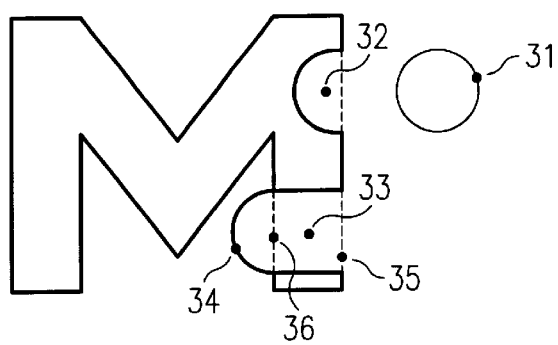
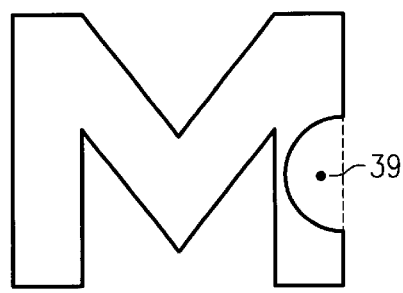

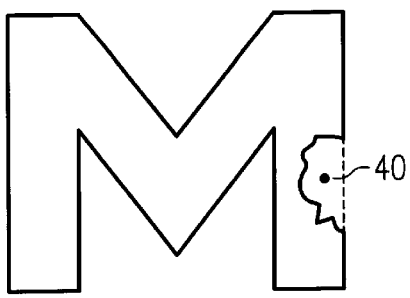
FIG. 3G
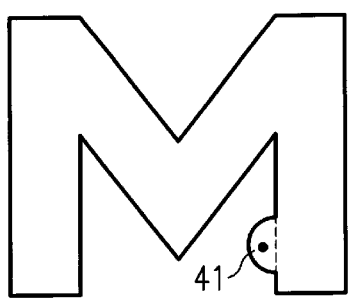
FIG. 3I
FIG. 3H
| SIZE | 20 |
FIG. 3J
| SIZE | 10 |
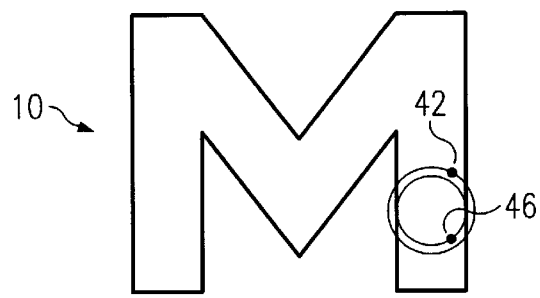
FIG. 4A
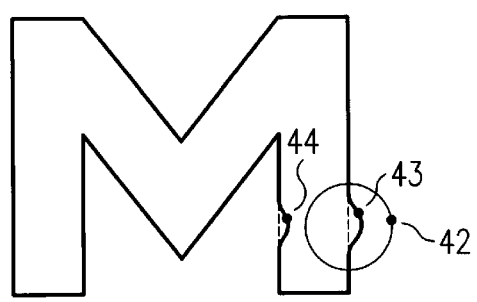
FIG. 4B
FIG. 4C
| SIZE | 25 |
| STRENGTH | 80% |
| SIZE PRESSURE | 0 |
| STRENGTH PRESSURE | 0 |

FIG. 4D
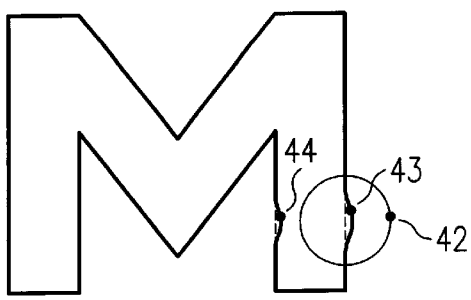
FIG. 4E
| SIZE | 25 |
|---|---|
| STRENGTH | 10% |
| SIZE PRESSURE | 0 |
| STRENGTH PRESSURE | 0 |
FIG. 4F
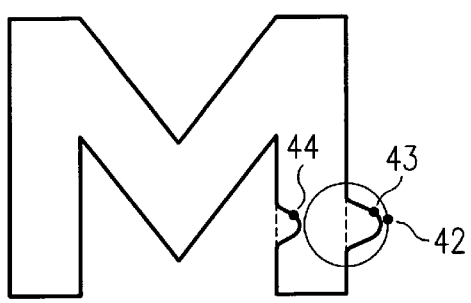
FIG. 4G
| SIZE | 25 |
|---|---|
| STRENGTH | 95% |
| SIZE PRESSURE | 0 |
| STRENGTH PRESSURE | 0 |
FIG. 4H
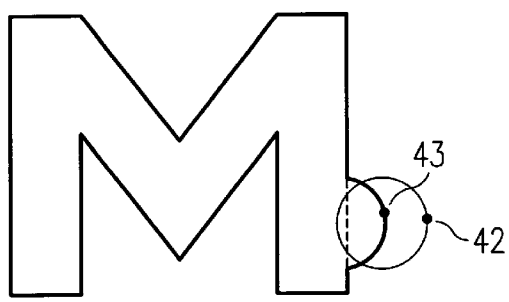
FIG. 4I
| SIZE | 10 |
|---|---|
| STRENGTH | 100% |
| SIZE PRESSURE | 0 |
| STRENGTH PRESSURE | 0 |
FIG. 4J
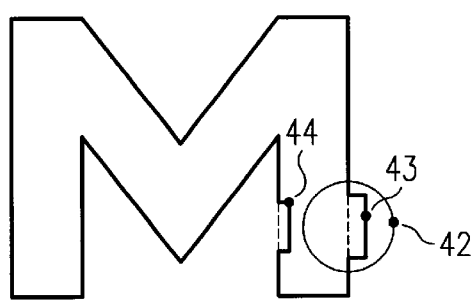
FIG. 4K
| SIZE | 25 |
|---|---|
| STRENGTH | 80% |
| SIZE PRESSURE | 0 |
| STRENGTH PRESSURE | 0 |

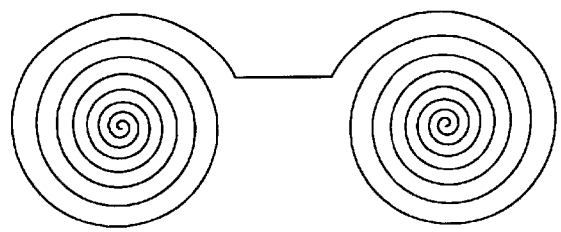
FIG. 4L
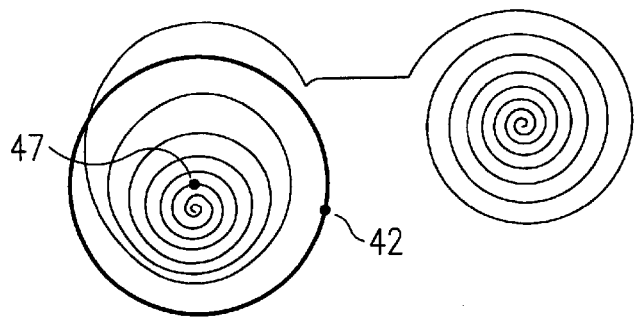
FIG. 4M
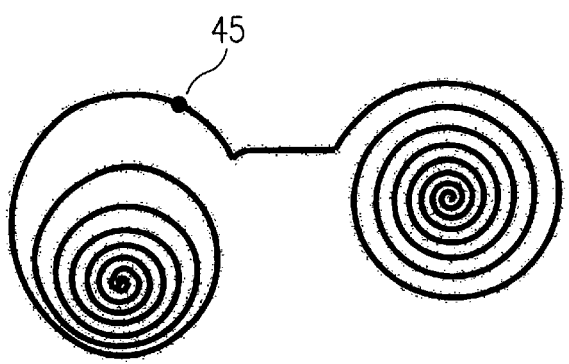
FIG. 4N
FIG. 4O
| | |
|---|---|
| SIZE | 100 |
| STRENGTH | 100% |
| SIZE PRESSURE | 0 |
| STRENGTH PRESSURE | 0 |

RESHAPING OF PATHS WITHOUT RESPECT TO CONTROL POINTS

REFERENCE TO RELATED APPLICATIONS

The present application is being concurrently filed with commonly assigned U.S. patent application Ser. No. 09/036,567 entitled "USING REMEMBERED PROPERTIES TO CREATE AND REGENERATE POINTS ALONG AN EDITABLE PATH", the disclosure of which is incorporated herein by reference and commonly assigned U.S. patent application Ser. No. 09/037,721 entitled "USE OF FILTERS ATTACHED TO OBJECTS TO MODIFY THE APPEARANCE OF THE OBJECTS", the disclosure of which is incorporated herein by reference.

TECHNICAL FIELD OF THE INVENTION

This application relates in general to the manipulation of computer graphic objects, and in specific to editing tools that allow the reshaping of the line paths that comprise the graphic objects, which are independent from the underlying format of the objects.

BACKGROUND OF THE INVENTION

In the prior art, a path can be created on a computer, such that the path is made up of Bezier control points. A Bezier curve is a mathematical description of a curve, which is characterized as a parametric cubic equation in X and Y. The X and Y locations along the curve are defined by two parametric cubic equations with four coefficients, with the parameters ranging from 0 to 1. This is used in graphical applications to represent curve paths. A Bezier control point is an alternate way of representing a Bezier curve. An individual curve is split up into two end points and two control points. The ends points are actually located on the curve. The control points are located off of the curve and are used to find the initial and final tangents of the curve. This is used in several graphic applications, for example, FreeHand, CorelDraw, Canvas, and Adobe Illustrator.

The prior art allows paths to be drawn comprising Bezier control points and Bezier handles. The control points are used to define specific places along the curve to anchor curves. The handles are used to define how the curve extends between the points and are used to reshape the curve. Thus, the points and handles are used to both reshape the curve and define the curve. There are several ways to reshape the curve. One way would be to select one of the Bezier control points and move that point. Another way would be to select the Bezier control points, which will show its corresponding handles, and move the handles. Note that this does not move the actual anchor point, but it reshapes the curve extending away from the anchor point. Another way to control the overall shape of a path would be to select multiple points and perform some operation on those points. The operation could be selecting multiple points and moving multiple points at once. This sort of stretches the selected part of the path. Another operation might be selecting points on a path and using some sort of filter to automatically add other points between the selected points, for example, a roughen filter that creates new points. Note that this does not change the overall shape of the path, it changes the appearance. So instead of adding a curve between two points, just changes the appearance of the path, for instance, it might add some rough jagged edges. Thus, the user has very little control over the actual shape of the path.

A problem with the prior art mechanisms is that the user has to understand Bezier control points, which is a sophisticated technology. This is problematic because Bezier control points are an abstraction away from the actual shape, so it is difficult to reshape a path without understanding Bezier control points and handles. Consequently, it is difficult to just select on a part of the path and move it to a desired location. Other prior art mechanisms allow for reshaping paths, without respect to points, and involves the selection of different areas of a path and shift dragging or manipulating the selected areas of the path while leaving the remaining points affected. This is still based on the control points and manipulation of control points, and not on the shape of the curve.

Another mechanism reshapes a path by using the control points, such that the area between select specific control points on a path is reshaped or moved. The problem is that this mechanism still only reshapes the existing points, and does not destroy them or create new ones. For example, points A and Z are selected, with points B-Y are reshaped or moved, however, these points still exist, they are never destroyed and new ones are never created. Thus, the overall path shape does not change very much. Consequently, this mechanism allows some general reshaping of the overall shape of the path, but it requires the user to still be very cognizant of the location of the control points. They may not ignore the control points, and must be careful about their placement.

In the prior art it is often hard to reshape the path, because there are many segments of the path in a very close area, i.e. overlapping segments. To reshaping an area of a path, particularly an area comprising overlapping paths, the prior art consists of mechanisms for scaling, skewing, or rotating, such that an entire area can be affected. Specific Bezier control points that has been selected can also be scaled or skewed or moved. The prior art also consists of a mechanism to use an envelope to describe the outer boundaries of an area, such that an entire path could be selected and put into a different perspective, for instance, leaning the path forward in space. A problem with this approach is that only the entire path can be affected at once, as opposed to a piece of the path.

Another problem is that even those techniques that allow multiple parts of a path to be affected still require the selection of specific Bezier control points rather than a specific region of space. For instance, if there are two points on top of each other, with a curve stretching to the right, the two points could be manipulated without having any control over the curve between them. The points can be scaled, but the curve would not be affected, except indirectly. Another problem is that the enveloping technique may allow manipulation of the entire path, but not a part of the path. One example of the envelope technique would be taking a path in the shape of the letter M, which has three descending stems coming down from the M. With enveloping, one could make the M wave like a flag in a breeze, but it would be very difficult to make only one of the three stems of the M wave like a flag in the breeze.

In summary, one problem with the prior art is that users have to understand Bezier control points. Thus, in order to reshape paths, users have to select specific Bezier control points. To reshape the path, the Bezier control points must be in the correct locations to accomplish the desired ends of the user. Thus, new points may have to be created, and others may have to be destroyed, in order to get the desired effect of the user are such operations are difficult to perform. Another problem is it is difficult to reshape a path based on an area in space, particularly overlapping paths. A further problem is that the user has very little control of the reshape of the path, as compared to the size of their precision point, in other words it is difficult to select exactly the desired part of the path for reshaping.

SUMMARY OF THE INVENTION

These and other objects, features and technical advantages are achieved by a system and method uses three different mechanism to manipulate paths.

The first mechanism allows a user to 'pull' a segment of a path. A user selects a specific place on the path, and without respect to existing Bezier control points, is able to pull the selected place along with a selected distance on either side of the place on the path, to a desired location.

So instead of the user having to select Bezier control points, the user merely selects any location along the path, and thereby will affect a segment of the path equal to a distance on either side of the selected location. The distance can be selected via several mechanisms. One is to dynamically use modifier keys to increment the distance. Another is to numerically specify an amount of distance on either side of the selected point. Another is via pressure controlled by a pressure sensitive pen. Note the distance can be set before or after selection of the point. The amount of path movement depends upon the distance from the selected location, in accordance with a transfer function, e.g. the inverse square of the distance. Thus, parts of the path that are further from the selected location will be moved less. The effect being that there is a gradual fall off of the path changes. Thus the change appears to be gradual or smooth, as opposed to radical. Note that the function could be a step function or sine function, or other arbitrary function designed by the user. The final results may involve internally either adding or deleting, and reshaping Bezier control points. However is the user is not confronted with the Bezier control points during the reshaping process.

The second mechanism allows a user to 'push' a segment of a path, by using an arbitrary shape and sculpting the path. The arbitrary shape is used in a manner similar in which a sculptor would use a putty knife and sculpts away part of the path, by pushing that shape into the path. The path is being repelled from the shape, as the shape is being pushed. For example, if the shape is a circle, then hemispherical depressions can be created by pushing the tool part way into the path. Note that the diameter can be changed, and thereby change the amount of the area that is displaced as the shape moves into the path. Just as with pulling mechanism, the pushing mechanism is directed to a particular place along the path, which is irrespective of Bezier control points. Bezier control points may be added or deleted, or the path reshaped depending on what is necessary to match the newly sculpted shape. The tool used to do the pushing does not have to be smooth, nor does not have to be round, it could be any arbitrary shape, e.g. the profile of a face. The size of the pushing tool can be varied dynamically by several mechanisms. For example, it can be varied by a specifically inputted number, it can be varied by pressure, or it could be varied by specific control keys on the keyboard. Each could be used to scale the pushing tool. Note that a difference between the pushing mechanism and the pulling mechanism is that in using the pulling mechanism, the user selects a specific point on the path and pulls that point, whereas with the pushing mechanism, the user applies a tool to different points along the path.

The third mechanism allows a user to reshape an area of the path. The area reshaping tool allows a user to select a specific point in space and modify any parts of the path that lie within that region of space. The defined region could be any arbitrary shape, including circular. The parameters of the region are strength and diameter. The diameter is the overall area that is being affected, and the strength is measure of the amount of the effect. The strength is similar to gravity, in that the effects are related to the distance from the center. Strength determines the area of the path is going to be affected relative to the amount of path movement in accordance with the transfer function. These parameters can be varied dynamically using mechanisms similar to the pushing and pulling tools.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 depicts an object with a path that forms the shape of a letter 'M';

FIGS. 2A–2H depict the effects of the pull tool on the object of FIG. 1 and the various tool settings used to achieve the effects;

FIGS. 3A–3J depict the effects of the push tool on the object of FIG. 1 and the various tool settings used to achieve the effects; and FIGS. 4A–4K depict the effects of the area reshaping tool on the object of FIG. 1 and the various tool settings used to achieve the effect;

FIG. 4L depicts an object with a path that forms a complex spiral path;

FIG. 4M depicts the effects of the area reshaping tool on the object of FIG. 4L;

FIG. 4N depicts the results of application of an airbrush effect on the path of FIG. 4M; and FIG. 4O depicts the settings used to achieve the effect of FIG. 4M.

DESCRIPTION OF THE PREFERRED EMBODIMENTS

FIG. 1 shows a path 10 that looks like the letter M. The portion of the path which will be affected by various manipulations of the tools is the segment between locations 13 and 14. Locations 11 and 12 are used as reference points with respect to subsequent descriptions of the various figures.

The inventive tools would be implemented on system which comprises a typical stand-alone personal computer, but could be part of a network system using terminals or work stations. Typical computer configuration is either a Macintosh computer or a Pentium PC running Microsoft Windows. The system would have 24 megabytes of RAM, but it could be less or it could be more. The system would have a processor speed of about 150 megahertz or higher, and a hard drive will have at least 500 megabytes of space. The monitor is preferably 17 inches, with a color depth in the millions of colors to allow for computer graphical manipulation of images, illustration, and objects. Note that the invention is not limited to 2-dimensional computer graphics, as it could be used for 3-dimensional computer graphics, as well as motion or animation graphics.

FIGS. 2A–2H illustrate the effects of the pulling tool on the path of FIG. 1. In FIG. 2A, a user has selected location 21a of the path as the central location for the operation of the pulling tool 23, and moved the path to location 21b. The pulling tool 23, as shown, appears as crosshairs. However, it may appear as an arrow, a dot or other circular object, a free form object that is user selected (for example, a rocket ship), or any other indication that would allow a user to select a particular location on the path. FIG. 2B shows graphical user interface window that displays the parameters of the tool. As shown in FIG. 2B, the length of the effect of the pull tool is set at 50. Therefore, the endpoints, 22a and 22b, are not selected by the user, but rather are selected by the tool based on the length set in FIG. 2B and the user selected central location 21a. As the user pulls the path 10 at location 21a out to 21b, the action taken by the pull tool is to move a segment of the path represented by the length between 22a and 22b. Each location on the segment is moved according to a predetermined curve or formula, based upon the distance that each location is from the selected location 21a. Note that only locations between 22a and 22b are affected, locations 13 and 14, as well as the remainder of the path 10 are not affected.

With the parameters as shown in FIG. 2B, the tool uses the selected location 21a as the central point and moves 25 units in either direction from 21a to designate locations 22a and 22b. As shown in FIG. 2A, locations 22a and 22b are approximately equal distant from location 21a, i.e. 25 units. However, this can be adjusted by the user such that the locations 22a and 22b have different distances. For example, if set to 50 in FIG. 2B, 22a may be 10 units from location 21a, while location 22b would be 40 units, and if set to 25, then 22a would be 5 units from location 21a, while location 22b would be 20 units. Note that the locations 22a and 22b are not determined by the user, but are derived by the tool based upon the input in FIG. 2B. Moreover, it should also be noted that the length of 50 is defined as 50 units on the original path between location 22a and 22b, and not the resulting end path. The end path may have a greater, or smaller length than 50 units.

In FIG. 2C, again the user has selected location 21a of the path as the central location for the operation of the pulling tool, and moved the path to location 21b. However, FIG. 2D shows the length of the effect of the pull tool which is set at 5, from locations 22a to 22b. Thus, pulling on location 21a results a smaller area of effect than in FIG. 2A, with the affected path resembling a small spike.

In FIG. 2E, again the user has selected location 21a of the path as the central location for the operation of the pulling tool, and moved the path to location 21b. However, FIG. 2F shows the length of the effect of the pull tool is set at 500. Thus, pulling on location 21a results in a much larger area of effect than in FIG. 2A, with the affected path resembles a larger portion of the M shaped path. Note the locations nearest to the endpoints 22a and 22b all move in a direction parallel to the segment formed by the movement of the path from the selected location 21a to 21b.

Note that the distance that each point between locations 22a and 22b moves in response to the movement of the path from 21a to 21b is different. Each point moves in accordance with a transfer function or predetermined formula, based upon each point's distance from the selected point 21a. In FIGS. 2A, 2C, and 2E the predetermined formula is a cosine formula $$\frac{1}{2} + \frac{1}{2}\text{cosine}\left(\frac{\pi * D}{length}\right),$$

wherein, D=distance from the point to point 21a. However, the formula can be selected by the user. For example, in FIG. 2G, the user has again selected location 21a of the path as the central location for the operation of the pulling tool, and moved the path to location 21b. FIG. 2H shows the length of the effect of the pull tool is 50, the same as FIG. 2B. However, the transfer function is a step function, so that each location between 22a and 22b is moved approximately the same amount. The predetermined formula could also be a series of step functions, such that the resulting path would resemble a layered wedding cake. Any formula could be used, including but not limited to sine, cosine, tangent, sine, parabolic, hyperbolic, power functions (e.g. $X^2$, $X^3$, etc.), and inverse functions.

The length in FIGS. 2B, 2D, 2F and 2H can be established by the user on the dynamic basis. Pressure can be used as an input mechanism to control the set length in FIG. 2B. The pressure in FIG. 2B is the default, 0. If the pressure were 10, it would be added to the length, so the result would be a length of 60. If the length is set at 50, pressure can be used to vary that length, or even to directly set that length, by way of a pressure sensitive tablet. Such pressure can be used while the tool is actually in use, such that pulling 21a through 21b, a higher pressure could have moved points 22a and 22b farther apart.

Therefore it is the computer and not the user that recalculates the number of points and the position of Bezier control point handles that are necessary to create a path to conform the pulled path. The user does not have to create the Bezier control points. The computer will create them, as needed, in order to match the result. Moreover, it should be noted that the inventive tools are not specific to the technology known as Bezier control points. It could be used with quadratic points or any other point of representation. The inventive tools allows the user to manipulate the path independent from the knowledge of the control points used to represent the path is adaptable to any graphical technology.

FIGS. 3A–3J illustrate the effects of the pushing tool on the path of FIG. 1. In FIG. 3A, the push tool 31 has been used to deform the path 10 as shown in FIG. 1 to form the sculpted out portion 32, which is about one half the diameter of the tool 31. The size of the tool 31 is selected by the user in the graphical user interface window shown in FIG. 3B which displays the parameters of the tool. As shown in FIG. 3B, the size of the push tool is set at 15. As the size is increased, the size of the tool is increased, and consequently, the size of the path that is effected by the tool is also increased.

The pushing tool operates much like an artisan's sculpting tool that is used to remove clay in making a sculpture. The tool 31 is pushed into the path, where it impacts the path and moves the path in accordance with the profile of the tool and to a desired depth. The depth of portion 32 is about one half the diameter of tool 31. The depth depends upon the usage of the tool. To make the sculpted portion 33, the tool 31 was moved laterally through the leg of the M shaped path. Note that the path 34, actually comprises two paths 35 and 36, which have been pushed on top of each other by tool 31. Paths 35 and 36 remain as separate segments in computer memory, but are depicted as a single path 34.

Note that the effects of the tool are cumulative, much in the same way that a sculptor's tool would sculpt with spoon prints on clay. Upon releasing the tool and finishing the operation, just as with FIG. 2, the computer in FIG. 3 will determine the approximate placement of points, based on the number of points or location of points, which are necessary to describe the newly deformed path.

FIG. 3C shows different uses of the tool of FIG. 3A. Note that these represent just two uses of the tool, and are not to be viewed as the only two uses. The sculpted portions 37 and 38 are formed by moving the tool in a manner different from FIG. 3A. In FIG. 3A, the tool is moved horizontally into and out of the path 10. Sculpted portion 37 is formed by an arcuate movement of the tool into and out of the path 10. Note that FIG. 3D indicates that the tool is the same size as the tool in FIG. 3B. Sculpted portion 38 is formed by moving the tool into the path to a depth of about one half of the diameter of the tool, and then moving the tool vertically. Other sculpted portions can be created by moving the tool in various combinations of horizontal, vertical, and curved movements. The resulted sculpted portion depends on the usage of the tool.

In FIG. 3E, the push tool has been used to deform the path to form the sculpted out portion 39, which is about one half the diameter of the tool. As shown in FIG. 3F, the size of the tool has been increased from 15 to 25, and thus, portion 39 is larger than portion 32. As stated elsewhere, the size can be set by means of either tablet pressure, keys on the keyboard, mouse movement, or other input methods.

In FIG. 3G, the push tool has been used to deform the path to form the sculpted out portion 40. As shown in FIG. 3H, the size of the tool is the same as FIG. 3B. However, the profile of the tool has been changed from the circle shown in FIGS. 3A, 3C, and 3E to the profile of a free form shape. The profile of the tool can be any shape, including but not limited to circles, ovals, squares, rectangles, triangles, trapezoids, other polygons, or free form shapes.

As shown in FIGS. 3A, 3C, 3E, and 3G, the tool can be used to push the path into the object. However, as shown in FIG. 3I, the tool can also push the path out of the object to form portion 41. Note that FIG. 3J indicates that the tool is smaller than in other figures.

FIGS. 4A–4O illustrate the effects of the area reshaping tool on the path of FIG. 1. In FIG. 4A, the reshaping tool 42 is located over a portion of the path 10. In FIG. 4B, the reshaping tool 42 has been laterally moved from its original position as shown in FIG. 4A. All locations within the circular area of effect of the tool 42 have been reshaped. FIG. 4C indicates that the size is currently set at 25. Note that as in FIGS. 2 and 3, the size could be set to any number of different sizes, either by a pressure sensitive tablet, by keys on a keyboard, or other input scheme.

FIG. 4A also depicts a secondary or internal circle 46 which is a visual indication of the strength setting. The internal circle 46 itself does not affect the path, but only provides the user with a visual cue as to the current strength setting. The internal circle 46 could be turned off by the user, as shown in FIG. 4B. As shown in FIG. 4C, the strength is currently set at 80% and the size at 50. The strength could be set to any number of different percentages from 0% to 100%, either by a pressure sensitive tablet, by keys on a keyboard, or other input scheme. The size can be set to any number of different values, including zero, by a pressure sensitive tablet, by keys on a keyboard, or other input scheme.

Usage of the tool 42 by activation and movement will deform an area of the path described as a region in X-Y space, as opposed to a particular segment of the path, so any location along the entire path that falls within the area defined by 42 will be reshaped. In FIG. 4B, the portions of the path within the tool as shown in FIG. 4A are moved laterally with tool 42. Thus, both sides 43, 44 of the M shaped path are moved. Note that right side portion 43 has moved more, since this side was closer to the center of the tool than left side portion 44. If the size of the tool were increased, more of the path would be within the tool, and hence more of the path would be moved. If the strength were increased, each point of the path would be moved a greater distance. Note that the tool need not have a circular shape, as any shape could be used, including arbitrary or free form shapes.

FIG. 4D depicts the effects of the settings of FIG. 4E on the path of FIG. 4A. In this case, the strength has been lowered from 80% in FIG. 4C to 10%. Thus, a similar amount of movement of the tool 42 yields smaller changes in the path 43,44 as compared to FIG. 4B.

FIG. 4F depicts the effects of the settings of FIG. 4G on the path of FIG. 4A. In this case, the strength has been raised from 80% in FIG. 4C to 95%. Thus, a similar amount of movement of the tool 42 yields larger changes and a sharper curve in the path 43,44 as compared to FIG. 4B.

FIG. 4H depicts the effects of the settings of FIG. 4I on the path of FIG. 4A. In this case, the size has been reduced from 25 in FIG. 4C to 10. Thus, a tool 42 will affect a smaller area of the path, and only affect one side of the M shaped path 43.

FIG. 4J depicts the effects of the settings of FIG. 4K on the path of FIG. 4A. In this case, the transfer function is a step function. Thus, both sides 43, 44 of the M shaped path are moved laterally with each point on each portion being moved approximately the same amount. Note that portion 43 has moved more than portion 44, as portion 43 was closer to the center of the tool 42. The transfer function could also be a series of step functions, such that the resulting path would resemble a layered wedding cake. Any formula could be used, including but not limited to sine, cosine, tangent, sinc, parabolic, hyperbolic, power functions (e.g. $X^2$, $X^3$, etc.), and inverse functions.

FIG. 4M depicts the effects of the settings of FIG. 4O on the path of FIG. 4L. In this case, the path is a complex spiral path, however, the path could have had many crossing and overlapping segments. As shown in FIG. 4M, all portions 47 of the path within tool 42 are moved as the tool is moved. The amount of movement depends on the distance from the center of the tool, the transfer function being used, and the movement of the tool by the user. FIG. 4N shows the results of the application of an air brush effect on the path of FIG. 4M. The resultant path is shown in FIG. 4n by reference numeral 45.

The underlying technology involves the conversion of the path to a series of segments that are spaced very closely together, then reshaping the segments according to the tool being used. The reshaped sets of line segments are refitted into the curve and reapplied to the original path. This technique is independent of the type of curve representation being used. If the curve representation is the Bezier control point, then the Bezier curves are flattened into small line segments, reshaped accordingly, and then refitted to the line segments to find the best fit. If the underlying representation are line segments, then all that is required is that the line segments be short enough. Thus, long segments may need to be split up into smaller pieces. After refitting, redundant points are eliminated, i.e. co-linear points.

Note that the following assumes that the points are sufficiently spaced together to maintain the appearance of curvature. For the pulling tool, the curve is subdivided into very short line segments. The point on the curve which is closest to the area that the user has selected is located. If the paths are subdivided small enough, then there will always be a point that is sufficiently close. Next, the farthest point out in either direction along the path is determined by the set distance along the path. Thus, all of the points in the affected range are projected in the direction the user is moving, biased by the transfer function. The transfer function determines the distance that each point will move from its original position.

The pushing tool starts out similarly, with the path being subdivided into very short line segments. After reshaping, the curves will be refitted to those line segments. The distance from each point of the tool is determined. If the tool is a circle, then each point is radially located from the center of the tool. Any path locations which are within the radius of the tool are projected outwards along the ray from the tool center to the existing point. They then are at a distance of the tool radius away from the center of the tool. The net affect is that no point in the path is allowed to get closer than the pushing radius to the tool center. If the tool has a non-circular shape, then the distance measurement is more complex, and the path is pushed out in the shape of the sculpting tool. For example, if the tool has an octagonal shape, then the distance for every point on the octagon must be determined so that the path will conform during pushing.

The area reshaping tool starts out similarly, with the path being subdivided or flattened into very short line segments. After reshaping, the curves will be refitted to those line segments. The portions of the path that lie inside the tool are determined. The distance from each point of the tool to the center of the tool is determined. If the tool is a circle, then each point is radially located from the center of the tool. If the tool has a non-circular shape, then the distance measurement is more complex. Any of the line segments that are within the tool radius are deemed to lie within the shape. The amount of movement of each point of the path that is located within the tool is then determined based upon the movement indicated by the user distance from the center and the transfer function. The transfer function determines what percentage of user's movement to transfer to each point.

To achieve a smooth appearance, the points located nearer the center of the tool are moved more than the points located farther away. The points that are outside the shape or at the very edge of the shape, are not. Thus, the transfer function varies from one in the center to zero at the outer edges of the shape. Any type of transfer function that can satisfy this requirement will suffice. For example, one function is a variant inverse power function varying from approximately one over X to the one half ($1/X^{1/2}$) to approximately one over X to the three halves ($1/X^{3/2}$). This transfer function will allow for a gradual fall off in the path so that points near the center are moving about the same distance as the user's input control (e.g. mouse or stylus), and those at the edge are moving very little. Thus, there is not a sudden fall off, or hard edged appearance. However, transfer functions with hard edges, such as a step function, could be used.

In order for the tools to operate, the paths must be editable, and hence stored. A path can be stored in any number of representations. One manner is to store a list of points, or X Y locations. One way to implement this would be to have a large memory array of two integers or two floating point numbers, which indicate the X and Y positions. This would make for efficient operations, as storing and retrieving them would be just a simple memory load and store. Another manner for representing the path would be to use a large memory array of points except that instead of using X Y locations for each point on the path, a list on Bezier curves is used. An individual Bezier curve is specified by four X Y locations. Note that there are many other alternative representations that could be used including, but not limited to, lists of quadratic curves, link lists of points, groups of points, or delta offsets from one point to the next. Note that the stored data is then used to derive the visual appearance of the path rather than the image itself or a collection of pixels, i.e. a bit map. Moreover, whatever type of path representation is used, there must be a way to translate that representation into a group of plane line segments, and then retranslate the plane line segments back into that path representation. Note that the inventive tools work with paths or vectors, and not bit maps. Bit maps have a different underlying technology from vectors, and do not have editable paths.

Although the present invention and its advantages have been described in detail, it should be understood that various changes, substitutions and alterations can be made herein without departing from the spirit and scope of the invention as defined by the appended claims.

What is claimed is:

1. A method for moving a portion of points on a path which is used in a representation of a graphical object, the method comprising the steps of:

selecting a principal point on the path;
  determining automatically the portion of points on said path based on a location of the principal point and a preset condition;
  moving the principal point by an amount to a location that is different from an original location; and
  moving each point in the portion by an amount based upon a predetermined formula and the amount of movement of the principal point, wherein the predetermined formula varies the amount of movement of each point based upon a distance that each point is from the principal point, and wherein the predetermined formula is a cosine formula.

2. The method of claim 1 wherein:
  the preset condition is selected by the user and represents a length of the path which will be moved.

3. The method of claim 2 wherein:
  the endpoints of the portion are calculated from the preset condition.

4. The method of claim 2 wherein:
  the preset condition is set by the user via a pressure sensitive input device.

5. The method of claim 2 wherein:
  the preset condition is set by the user via a keyboard input device.

6. The method of claim 1 further comprising the step of:
  converting the path into a plurality of line segments.

7. A tool for moving a portion of points on a path which is used in a representation of a graphical object, the tool comprising:

means for selecting a principal point on the path;
  means for determining automatically the portion of points on said path based on a location of the principal point and a preset condition;
  means for moving the principal point by an amount to a location that is different from an original location; and
  means for moving each point in the portion by an amount based upon a predetermined formula and the amount of movement of the principal point, wherein the predetermined formula varies the amount of movement of each point based upon a distance that each point is from the principal point, and wherein the predetermined formula is a cosine formula.

8. The tool of claim 7 wherein:

the preset condition is selected by the user and represents a length of the path which will be moved.

9. The tool of claim 8 wherein:

the endpoints of the portion are calculated from the preset condition.

10. The tool of claim 8 wherein:

the preset condition is set by the user via a pressure sensitive input device.

11. The tool of claim 8 wherein:

the preset condition is set by the user via a keyboard input device.

12. The tool of claim 7 further comprising:

means for converting the path into a plurality of line segments.

13. A method for moving a portion of points on a path which is used in a representation of a graphical object, the method comprising the steps of:

urging a tool into contact with the portion of the path; and moving each point in the portion by an amount based upon a size of the tool and the amount of movement of the tool;

wherein each point in the portion is deflected away from the tool and maintained at a predetermined distance from a center of the tool.

14. The method of claim 13 wherein:

the size is selected by the user.

15. The method of claim 14 wherein:

the size is set by the user via a pressure sensitive input device.

16. The method of claim 14 wherein:

the size is set by the user via a keyboard input device.

17. The method of claim 13 further comprising the step of:

converting the path into a plurality of line segments.

18. The method of claim 13 wherein:

the tool has a predetermined profile.

19. The method of claim 18 wherein:

the predetermined profile is a circle.

20. The method of claim 18 wherein:

the predetermined profile is a polygon.

21. The method of claim 18 wherein:

the predetermined profile is a free form shape.

22. The method of claim 13 wherein:

the tool sculpts the representation of the graphical object.

23. A tool for moving a portion of points on a path which is used in a representation of a graphical object, wherein the tool is urged into contact with the portion of the path, the tool comprising:

means for setting a size of the tool; and means for moving each point in the portion by an amount based upon the size of the tool and the amount of movement of the tool;

wherein each point in the portion is deflected away from the tool and maintained at a predetermined distance from a center of the tool.

24. The tool of claim 23 wherein:

the size is selected by the user.

25. The tool of claim 24 wherein:

the size is set by the user via a pressure sensitive input device.

26. The tool of claim 24 wherein:

the size is set by the user via a keyboard input device.

27. The tool of claim 23 further comprising:

means for converting the path into a plurality of line segments.

28. The tool of claim 23 wherein:

the tool has a predetermined profile.

29. The tool of claim 28 wherein:

the predetermined profile is a circle.

30. The tool of claim 28 wherein:

the predetermined profile is a polygon.

31. The tool of claim 28 wherein:

the predetermined profile is a free form shape.

32. The tool of claim 23 wherein:

the tool sculpts the representation of the graphical object.

33. A method for moving a portion of points on a path which is used in a representation of a graphical object, the method comprising the steps of:

selecting a region which encompasses the portion of points on the path to be moved;

moving the region by an amount to a location that is different from an original location of the region; and moving each point in the portion by an amount based upon, a predetermined setting, a predetermined formula, and the amount of movement of the region, wherein the predetermined formula varies the amount of movement of each point based upon a distance that each point is from a center of the region, and wherein the predetermined formula is a cosine formula.

34. The method of claim 33 wherein:

a size of the region is selected by the user.

35. The method of claim 34 wherein:

the size is set by the user via a pressure sensitive input device.

36. The method of claim 34 wherein:

the size is set by the user via a keyboard input device.

37. The method of claim 33 further comprising the step of:

converting the path into a plurality of line segments.

38. The method of claim 33 wherein:

the predetermined setting is selected by the user, and represents a magnification factor which is applied to the predetermined formula.

39. The method of claim 34 wherein:

the predetermined setting is set by the user via a pressure sensitive input device.

40. The method of claim 34 wherein:

the predetermined setting is set by the user via a keyboard input device.

41. A tool for moving a portion of points on a path which is used in a representation of a graphical object, the tool comprising:

a region which encompasses the portion of points on the path to be moved;

means for moving the region by an amount to a location that is different from an original location of the region; and means for moving each point in the portion by an amount based upon, a predetermined setting, a predetermined formula, and the amount of movement of the region, wherein the predetermined formula varies the amount of movement of each point based upon a distance that each point is from a center of the region, and wherein the predetermined formula is a cosine formula.

42. The tool of claim 41 wherein:

a size of the region is selected by the user.

43. The tool of claim 42 wherein:

the size is set by the user via a pressure sensitive input device.

44. The tool of claim 42 wherein:

the size is set by the user via a keyboard input device.

45. The tool of claim 41 wherein:

the predetermined setting is selected by the user, and represents a magnification factor which is applied to the predetermined formula.

46. The tool of claim 45 wherein:

the predetermined setting is set by the user via a pressure sensitive input device.

47. The tool of claim 45 wherein:

the predetermined setting is set by the user via a keyboard input device.

48. The tool of claim 41 further comprising:

means for converting the path into a plurality of line segments.

49. A method for moving a portion of points on a path which is used in a representation of a graphical object, the method comprising the steps of:

selecting a principal point on the path;

determining automatically the portion of points on said path based on a location of the principal point and a preset condition;

moving the principal point by an amount to a location that is different from an original location; and moving each point in the portion by an amount based upon a predetermined formula and the amount of movement of the principal point, wherein the predetermined formula varies the amount of movement of each point based upon a distance that each point is from the principal point, and wherein the predetermined formula is one of the following: sine formula, cosine formula, tangent formula, sinc formula, parabolic formula, hyperbolic formula, and power function formula.

50. The method of claim 49 wherein:

the preset condition is selected by the user and represents a length of the path which will be moved.

51. The method of claim 50 wherein:

the endpoints of the portion are calculated from the preset condition.

52. The method of claim 50 wherein:

the preset condition is set by the user via a pressure sensitive input device.

53. The method of claim 50 wherein:

the preset condition is set by the user via a keyboard input device.

54. The method of claim 49 further comprising the step of:

converting the path into a plurality of line segments.

55. A tool for moving a portion of points on a path which is used in a representation of a graphical object, the tool comprising:

means for selecting a principal point on the path;

means for determining automatically the portion of points on said path based on a location of the principal point and a preset condition;

means for moving the principal point by an amount to a location that is different from an original location; and means for moving each point in the portion by an amount based upon a predetermined formula and the amount of movement of the principal point, wherein the predetermined formula varies the amount of movement of each point based upon a distance that each point is from the principal point, and wherein the predetermined formula is one of the following: sine formula, cosine formula, tangent formula, sinc formula, parabolic formula, hyperbolic formula, and power function formula.

56. The tool of claim 55 wherein:

the preset condition is selected by the user and represents a length of the path which will be moved.

57. The tool of claim 56 wherein:

the endpoints of the portion are calculated from the preset condition.

58. The tool of claim 56 wherein:

the preset condition is set by the user via a pressure sensitive input device.

59. The tool of claim 56 wherein:

the preset condition is set by the user via a keyboard input device.

60. The method of claim 55 further comprising the step of:

converting the path into a plurality of line segments.

* * * * *

UNITED STATES PATENT AND TRADEMARK OFFICE
CERTIFICATE OF CORRECTION

PATENT NO. : 6,459,439 B1
DATED : October 1, 2002
INVENTOR(S) : John B. Ahlquist, Jr. et al.

It is certified that error appears in the above-identified patent and that said Letters Patent is hereby corrected as shown below:

<u>Column 6,</u>
Line 23, delete "sine," and insert -- sinc, --

Signed and Sealed this

Tenth Day of June, 2003

JAMES E. ROGAN
*Director of the United States Patent and Trademark Office*